United States Patent [19]

Puskar

[11] 3,765,921

[45] Oct. 16, 1973

[54] PRODUCTION OF CALCINED CLAY PIGMENT FROM PAPER WASTES

[75] Inventor: Victor Puskar, Piscataway, N.J.

[73] Assignee: Engelhard Minerals & Chemicals Corporation, Woodbridge, N.J.

[22] Filed: Mar. 13, 1972

[21] Appl. No.: 234,310

[52] U.S. Cl. .............................. 106/288 B, 106/72
[51] Int. Cl. ............................................. C08h 17/06
[58] Field of Search ........................... 106/72, 288 B

[56] References Cited
UNITED STATES PATENTS

| | | | |
|---|---|---|---|
| 3,014,836 | 12/1961 | Proctor | 106/72 |
| 3,301,691 | 1/1967 | Hemstock et al. | 106/72 |
| 3,320,076 | 5/1967 | Sutton | 106/72 |
| 3,482,685 | 12/1969 | Malden et al. | 106/72 |

*Primary Examiner*—Curtis R. Davis
*Attorney*—Melvin C. Flint et al.

[57] ABSTRACT

Papermaking sludge composed of a mixture which is predominantly cellulosic fiber and kaolin clay filler or pigment is dried and the fiber is removed by igniting it under controlled temperature conditions. The ash is pulverized, slurried in water and ground with an abrasive grinding medium. A fine size fraction of ground ash is dried, pulverized and calcined under controlled temperature conditions. A fine size, high brightness, low abrasion calcined clay pigment, suitable for reuse by a paper mill, is obtained.

10 Claims, No Drawings

PRODUCTION OF CALCINED CLAY PIGMENT FROM PAPER WASTES

BACKGROUND OF THE INVENTION

Mills producing quality printing paper such as magazine stock utilize large quantities of coating grades of kaolin clay. The clay is employed to improve the smoothness and printability of the paper. The clays that are employed for such use are generally at least 80 percent finer than 2 microns, have a G.E. brightness above 88 percent, preferably at 90 percent or above, and are low in abrasiveness. Certain grades of kaolin clay are employed to fill paper. High brightness is desirable in a filler clay and low abrasiveness is essential.

In its naturally-occurring state or condition kaolin clay minerals are crystalline hydrated aluminum silicates. Calcination of kaolin clay minerals results in removal of water of crystallization from the mineral particles. Generally the brightness and opacifying ability of the clay are desirably increased by calcination, especially when calcination is carried out at temperatures that are sufficiently high, generally above 1,900° F., to cause the kaolin to undergo an exothermic reaction. However, the clay tends to increase significantly in abrasiveness when it is calcined at such elevated temperatures. For example, a typical No. 1 grade of hydrated Georgia kaolin clay has an abrasion value (Valley) below 20 mg. and a brightness of 88 percent to 90 percent. When such clay is calcined at temperatures within the range of about 1,900° to 2,100° F., the products usually have abrasion values within the range of 100 mg. to 500 mg. and brightness values above 90 percent.

In recent years paper mills have been faced with the problem of reducing the amount of suspended solids discharged into streams. In the case of mills which employ clay coating pigments and/or fillers, the sludges contain a mixture of cellulose fiber and kaolin clay. Normally the sludges contain impurities such as rust and debris which are not constituents of the pigments or fibers. Such sludges are viscous or pasty masses, usually strongly alkaline. The color is usually brown or dark gray even after deinking has been carried out. Quantitative separation of the fibers from the clay and other minerals in order to recover and reuse the fiber or mineral is generally not possible.

The suggestion has been made to recover a calcined pigment from the mineral content of sludges, deinked sludges in particular, by burning away the fiber and grinding the sludge before or after calcination.

PRIOR ART

Results of prior attempts to produce a calcined kaolin pigment or filler from papermill sludges appear in an article by A. H. Nadelman and L. P. Newton, "A PRACTICAL APPROACH TO UTILIZATION OF SOLIDS FROM DEINKING MILL EFFLUENT," TAPPI, Vol. 43, No. 2, February 1960, pages 120 to 128. Maximum brightness (82.0 percent) was obtained by incinerating the sludge at 1,700° F. By pulverizing the sludge before incineration, a brightness of 86.3 percent was obtained at 1,700° F. Using the 1,700° F. calcination temperature, however, the calcined product was about 10 times as abrasive as a standard kaolin clay, even after the calcined sludge produced had been wet ball milled for 24 hours. Thus, calcined kaolin products possessing the high brightness and low abrasiveness necessary for practical use were not obtained.

Calcination of deinking sludge residue through a plurality of heating zones maintained at progressively increased temperatures, the final zone being at 1,500° to 1,700° F., is described in U. S. Pat. No. 3,320,076 to Robert W. Sutton. Results reported in the patent show that the resulting calcined kaolin pigment was no brighter than the calcined kaolin pigments described in the TAPPI publication (supra). Abrasion values were not reported.

THE INVENTION

Accordingly, an object of the invention is to reclaim from paper sludge a calcined clay pigment possessing the combination of high brightness, fine particle size and low abrasiveness.

A specific object is to provide such reclaimed pigment which possesses a brightness (G.E.) of at least 90 percent and an abrasion value (Valley) below 50 and a particle size suitable for paper coating or filling use.

Another object is to provide a method for processing waste paper sludge including a substantial quantity of hydrated kaolin clay by a unique combination of steps which, in combination, provide a calcined pigment product possessing the desired high brightness, low abrasiveness and fine particle size.

Briefly stated, the method of the present invention comprises the steps of heating a mixture including cellulose fiber and kaolin clay to a temperature sufficiently high to burn the fiber but insufficient to generate enough heat to cause the mass temperature to result in mullite formation (or formation of other high temperature crystalline phases), pulverizing the ash, grinding the ash, preferably by wet grinding with a particulate grinding medium, recovering a fine size fraction of ground ash in the form of an aqueous suspension, drying, pulverizing and then calcining the ash at a temperature and for a time sufficient to dehydrate substantially completely the kaolin clay without forming an excessively abrasive product. In an especially preferred embodiment, means is provided for removing iron impurities before and/or during calcination and carrying out the calcination at a temperature below 2,000° F.

DETAILED DESCRIPTION

Papermill effluents which may be treated by the method of the invention include, by way of example, white waters from paper machines and effluents from deinking mills. Combination of effluents may be processed.

The effluents preferably have a low calcium content, e.g., the ash contains less than 3 percent CaO and should be low or free from other fluxing agents such as alkali metal salts or alkaline earth metal salts. Thus, it is preferable to employ effluent sludges which have been flocculated and thickened with materials other than lime. Examples of non-lime flocculants are alum, mineral acid and polymeric polyelectrolytes. Titania and other papermaking pigment or fillers may be present. When the fiber content is of value and is amenable to separation, it may be advantageous to remove a portion of the fiber from the mineral content of the sludge by flotation and/or screening prior to carrying out the process of the invention.

Normally the sludge is dewatered by filtration and dried at least to a semisolid consistency before igniting the fiber. The fiber may be ignited by heating the mass in the presence of air to a temperature within the range of 500° to 1,500° F. until substantially all combustible matter is burned. Generally, it is preferable to ignite the fiber (and other carbonaceous organic impurities) by heating the mass to a temperature within the range of about 700° to 1,350° F. in order to assure elimination of substantially all combustibles without risking the conversion of the clay to an abrasive, high temperature crystalline phase such as mullite. It is not necessary to obtain complete combustion of the organic material since residual carbon may be readily oxidized and removed in a subsequent calcination treatment. Thus, excellent results were obtained when the ash from the fiber ignition step had an appearance similar to that of charcoal briquettes.

Removal of the fibers from the mineral constituents of the sludge results in an ash which is more amenable to ultrafine wet grinding than would be a mixture of mineral and unburned fiber. This is explained by the fact that the fine cellulosic fibers bind the mineral particles in the sludge to form hard, cemented masses which are difficult to grind to particles 5 microns or finer in conventional wet or dry grinding mills. By removing or carbonizing the fibrous cementing agent before attempting to find grind the mineral, the ash which is obtained is readily amenable to fine grinding. When finely ground, fractionated ash is subsequently charged to a calciner in a second heat treatment step, essentially complete removal of residual combustibles or incompletely burned matter is assured. Furthermore, by charging ultrafine ash to the second calciner, a calcined product of low abrasiveness is obtained. In contrast, a significantly more abrasive calcined product will normally be obtained if the ash were to be charged to the second calciner in the form of coarse lumps.

After igniting the organic matter in the sludge, the ash is cooled and preferably pulverized to a size suitable for charging to a magnetic separator for removal of ferruginous matter. The ash may be pulverized to minus 100 mesh (Tyler) or finer, preferably minus 200 mesh. A hammer mill is suitable.

It is preferable to fine grind the ash by wet milling with suitable grinding media since wet milling is especially effective in reducing the ash to the desired fine size. Furthermore, wet milling results in a suspension of ground ash which may be screened if necessary to eliminate coarse lumps and may be fractionated to recover a desired fine particle size fraction to charge to the calciners.

A third benefit of utilizing wet milling is that the ash is present in aqueous suspension and is amenable to wet magnetic treatment to remove magnetically susceptible material, especially tramp material, which may be present and would impair the brightness of the finished pigment.

To wet grind the ash, it is slurried in water, preferably in the presence of a dispersant such as a sodium condensed phosphare or a mixture of dispersant such as soda ash and sodium silicate, to form a fluid slurry containing 10 percent to 50 percent solids. This slurry may be charged to a wet magnetic separator of high or low intensity, depending upon the magnetic susceptibility of the impurities.

An abrasive grinding medium, exemplified by 10/35 mesh (Tyler) sand, alumina or shot, is incorporated into the slurry, preferably after any magnetic treatment, and the mixture is attrition ground until the ash has an appreciable content of minus 3 micron (equivalent spherical diameter) particles. The grinding systems described in U. S. Pat. No. 3,313,492 and U. S. Pat. No. 3,398,008 to Jacobs et al and U. S. Pat. No. 3,097,801 to Duke are suitable, although the invention is not limited thereto. Nonabrasive grinding media such as nylon pellets may be employed with some ashes.

The grinding medium is removed from the slip of ground ash which is then fractionated by controlled sedimentation or in a centrifuge to recover a fine size fraction. Preferably, at least 70 percent by weight of the fine size fraction is finer than 3 microns (e.s.d.) The oversize may be recirculated in the grinding mill.

The slip of the fine size fraction of ash may then be flocculated by addition of a mineral acid and/or alum and the flocculated ash pulp is thickened by decanting or siphoning supernatant liquid. An organic polyelectrolyte may be employed to flocculate the system. The resulting thickened pulp is preferably washed (water or dilute acid) in order to remove alkaline dispersant in order to avoid fluxing during subsequent calcination. The pulp is dried, e.g., in a spray dryer, and pulverized, preferably to 100 mesh or finer.

In most cases it is necessary to carry out the second calcination treatment at a temperature below that at which the kaolin in the ash undergoes completely the characteristic exotherm in order to obtain a product having the desired low abrasiveness. The exotherm typically begins when kaolin is heated to a temperature of about 1,800° F. and varies from clay to clay. It will be noted that kaolin clays do not completely undergo the exotherm until they have been exposed to elevated temperature for a sufficiently long time. Thus, maximum calcination temperature is time dependent and kaolin clay may be exposed to heating gas at a temperature above about 1,800° F or even 2,000° F. without completely undergoing the exotherm. The presence of an exotherm, residual or complete, may be detected by conventional differential thermal analysis (DTA) studies. See U. S. Pat. No. 3,506,594 to Haden et al.

Thus, in carrying out the invention, the calcination may be carried out by heating the fine ash at a temperature within the range of 1,600° to 2,200° F., preferably below 2,000° F., for a time which is temperature dependent. A preferred calciner is described in U. S. Pat. No. 3,383,438 to Allegrini et al.

In a specially preferred embodiment of the invention, the ground ash is admixed with a minor amount of ammonium chloride before undergoing calcination. From 0.5 percent to 10 percent, preferably 1 percent to 5 percent, ammonium chloride, based upon the ash weight, is recommended. By calcining the ash in the presence of ammonium chloride, a relatively low calcination temperature, e.g., 1,800° F., will produce a calcined clay pigment that may be as bright as but significantly less abrasive than the pigment would be if a higher calcination temperature were employed. However, removal of iron by other means, such as a highly efficient magnetic separator, prior to the second calcination treatment, may permit the use of the relatively low calcination temperature without addition of an agent to volatilize iron during calcination.

It is usually desirable to pulverize the discharge from the calciner. A hammer mill may be employed. Normally the calcined clay should be pulverized to minus 200 mesh or finer.

Representative calcined products of the invention are essentially (e.g., 97 percent or more) finer than 2 microns and have an average size below 1 micron (e.g., 0.8 micron). Brightness (G.E.) is preferably 90 percent or above. Valley abrasion is desirably below 50 mg., e.g., 20 to 45 mg.

My invention and some aspects thereof may be more fully understood from the following examples given for illustrative purposes.

The sludge used in the examples was obtained from the Kimberly-Clark mill in Wisconsin. The sludge was a composite from mill white water waste, debarking waste, ground wood waste and bleach liquor waste. The treatment of the mill effluent to obtain such sludge is described in "DIFFICULT LIQUID EFFLUENT PROBLEMS BEING SOLVED BY K-C," Paper Trade Journal, June 14, 1971, page 43.

The starting sludge was at 18 percent solids (wt.) Fiber and mineral contents (bone dry weight basis) were 59.0 percent and 41.0 percent, respectively. Analysis of the mineral content of a volatile-free weight basis, determined after heating to essentially constant weight at 1,800° F. and expressed as oxides, were: $SiO_2$ – 48.7 percent; $Al_2O_3$ – 43.7 percent; $TiO_2$ – 4.3 percent; $Fe_2O_3$ – 1.7 percent; $CaO$ – 1.6 percent.

EXAMPLE I

In accordance with the present invention, the sludge as received was dried at 175° F. to remove most of the liquid water. To ignite the fiber, the dried material was placed in a muffle furnace set at 900° F. The sludge was maintained in the furnace for 2½ hours. To provide oxygen for combustion, the door to the furnace was left partially open during this period. The discharge from the furnace, representing 41 percent by weight of the solids in the sludge, was analyzed by X-ray diffraction. The X-ray diffraction pattern indicated that metakaolin was present. The presence of metakaolin (a dehydroxylated form of kaolin clay) indicates that mass temperature had reached at least about 1,350° F, during ignition. The ash had the appearance and consistency of conventional charcoal briquettes.

In order to place the ash in a form suitable for wet grinding, it was pulverized and mixed with sufficient water to form a 50 percent solids pulp. To facilitate grinding and fractionation the pulp was dispersed by adding tetrasodium pyrophosphate in amount of 8 lbs./ton of solids, "O" sodium silicate solution in amount of 24 lbs./ton and sodium hydroxide to pH 11. The pulp was thoroughly agitated to disperse the ash. To remove oversize, the pulp was screened over a 100 mesh screen. The minus 100 mesh pulp was diluted with water to 25 percent solids and iron was removed with a magnet. The degritted pulp was then sand ground for 3 hours as described in U. S. Pat. No. 3,097,801 to Duke using proportions of 2,000 parts by weight 10/35 mesh silica sand, 250 parts by weight ash and 750 parts by weight water.

The pulp was drained from the grinding mill and fractionated at 3 microns (e.s.d.). The slip of minus 3 micron ash, representing 28.1 percent of the solids content of the sludge (70 percent of the mineral content), was flocced by adding sulfuric acid to pH of about 3 and thickened by decanting water. The thickened pulp was filtered, washed with water (to remove salts), dried at 175° F. and pulverized twice in a hammer mill through a 0.020 inch screen. At this point of the process the product had a brightness of only 40.2 percent.

In order to increase the brightness of the ash to a value of 90 percent or above without converting it to an abrasive material which would wear papermaking equipment, a portion of the pulverized ash was calcined under controlled conditions, as follows. The pulverized, fine size fraction of ash was blended with 3 percent by weight ammonium chloride and the mixture was placed in a muffle furnace at 1,650° F. The ammonium chloride was employed to convert ferruginous matter into volatile material. The temperature of the furnace was then raised to 1,850° F. The charge was maintained in the furnace with the 1,850° F. setting for 40 minutes. After cooling, the calcined product was pulverized in a hammer mill (single pass) through a 0.02 inch screen.

The product which was obtained had a G.E. brightness of 90.7 percent. Valley abrasion was only 41 mg. The particles were essentially all finer than 2 microns and 50 percent was finer than 1 micron.

EXAMPLE II

In another test representing the process of the invention, the procedure of Example I was repeated except that when igniting the fiber the sludge was ignited in a muffle furnace at 1,200° F. with excess air for 2 hours. As a further departure, the ash was dispersed with soda ash (to pH 8.5); 8 lbs./ton tetrasodium pyrophosphate and 24 lbs./ton sodium silicate. The other steps, reagents, were the same used in Example I. The brightness of the calcined pigment was 90.2 percent and abrasion was 38 mg.

EXAMPLE III

This example demonstrates the advantage of mixing the ash of the fiber ignition step with ammonium chloride before calcining such ash at relatively low temperature to brighten the ash substantially without imparting excessive abrasiveness.

A portion of the pulverized fine size fraction of ash (Example I) was calcined in a muffle furnace at 1,650° to 1,850° F. for 40 minutes (without addition of ammonium chloride) and repulverized, as in Example I. Brightness was only 87.0 percent whereas in Example I brightness was 90.7 percent when calcination at 1,650° to 1,850° F was carried out in the presence of added ammonium chloride.

Therefore, the desired brightness was not obtained when a moderate calcination temperature of 1,650° to 1,850° F. was employed and no ammonium chloride had been added to the ash before it was calcined. Since the brightness was undesirably low, no attempt was made to measure abrasiveness. However, more efficient removal of iron in the magnetic separation step could have obviated the need to use ammonium chloride.

EXAMPLE IV

In view of the expectation that a calcination temperature of 2,000° F. would provide a brighter pigment than was obtained by the procedure of Example III, another portion of the pulverized, fractionated ash of Example I was calcined at 2,000° F. (without addition of ammonium chloride) for 40 minutes. As expected, brightness did improve, as compared to results obtained at 1,650° to 1,850° F. without adding ammonium chloride. The 90.5 percent brightness of the product calcined at 2,000° F. compared favorably to the 90.7 percent brightness of the product calcined at 1,650° to 1,850° F. in the presence of ammonium chloride. However, the product calcined at 2,000° F. was excessively abrasive, having a Valley abrasion of 112 mg. as compared to the 40 mg. abrasiveness of the product of Example I.

Procedures for measuring brightness, particle size and Valley abrasion are described in U. S. Pat. No. 3,586,523 to Fanselow.

I claim:

1. A method for treating a papermill waste effluent comprising an aqueous suspension of an admixture of paper fibers and pigment, at least a major amount of said pigment being hydrated kaolin clay and the suspension being low in alkali and alkaline earth fluxing agents, which method comprises:

heating said admixture at a temperature sufficient to burn said fibers but insufficient to cause the temperature of the kaolin to convert to mullite, thereby forming an ash, grinding said ash in the presence of water with particulate grinding medium until the particles in said ash are reduced in size, recovering a fine size fraction of ground ash in the form of a suspension, acidifying said suspension to flocculate said fine particles of ash, removing sufficient water from the flocced particles to provide a pulverulent mass, pulverizing said mass, calcining the pulverized mass at a temperature and time sufficient to dehydroxylate said kaolin clay substantally completely without forming an excessively abrasive product, and pulverizing the calcined product.

2. The method of claim 1 wherein said fine size fraction of ground ash is substantially all finer than 3 microns.

3. The method of claim 1 wherein the effluent is low in alkali and alkaline earth fluxing agents.

4. The method of claim 1 wherein a small amount of ammonium chloride is admixed with the pulverized mass before said mass is calcined.

5. The method of claim 1 wherein said suspension of ground ash is treated in a magnetic separator before the mass is calcined at a temperature and time sufficient to dehydroxylate said clay.

6. The method of claim 5 wherein the pulverized mass is calcined at a temperature within the range of about 1,650° to 1,850° F.

7. The method of claim 6 wherein the pulverized calcined product has a Valley abrasion below 50 mg. and exhibits an exothermic reaction at about 1,800° F. when subjected to DTA analysis.

8. A method for treating a papermill waste effluent comprising an aqueous mixture of paper fibers, pigment and debris including ferruginous matter, at least a major amount of said pigment being hydrated kaolin clay, the solids in said mixture containing less than 3 percent CaO, which method comprises:

heating said mixture to a temperature sufficient to burn said fibers, said temperature being within the range of 500° to 1,500° F., thereby forming an ash, slurrying said ash in water to form a suspension, grinding said suspension with a particulate abrasive grinding medium in the presence of an alkaline dispersant until the particles of ash are reduced in size, subjecting said suspension to hydraulic classification and recovering a fine size fraction of ground ash in the form of an aqueous suspension, said fine size fraction being composed of particles substantially all of which are finer than 3 microns, subjecting said suspension containing said fine size fraction of ground ash to the action of a magnetic separator to remove magnetic material therefrom, flocculating said suspension by adding an acidic substance, washing the resulting flocculated material to remove salts therefrom, removing sufficient water from the washed, flocculated material to provide a pulverulent mass, pulverizing said mass, mixing said pulverized mass with 1 percent to 5 percent ammonium chloride and calcining the mixture at a temperature below 2,000° F. and sufficient to brighten the ash therein to a G.E. brightness value above 90 percent without forming mullite.

9. The method of claim 8 wherein said fibers are burned at a temperature within the range of 700° to 1,350° F. and said mixture containing ammonium chloride and ground ash is calcined at a temperature within the range of about 1,650° to 1,850° F.

10. A calcined clay product obtained by the method of claim 1.

* * * * *